US 6,688,622 B2

(12) United States Patent
Leon

(10) Patent No.: US 6,688,622 B2
(45) Date of Patent: Feb. 10, 2004

(54) BICYCLE TRANSPORTER

(76) Inventor: Michael Anthony Leon, 1135 Edgewood Ranch Rd., Orange, FL (US) 32835

( * ) Notice: Subject to any disclaimer, the term of this patent is extended or adjusted under 35 U.S.C. 154(b) by 0 days.

(21) Appl. No.: 10/104,435

(22) Filed: Mar. 22, 2002

(65) Prior Publication Data
US 2002/0135155 A1 Sep. 26, 2002

Related U.S. Application Data
(60) Provisional application No. 60/277,905, filed on Mar. 23, 2001.

(51) Int. Cl.[7] .............................................. B66K 27/00
(52) U.S. Cl. ....................................... 280/204; 280/402
(58) Field of Search ................................ 280/204, 402, 280/480

(56) References Cited

U.S. PATENT DOCUMENTS

| 5,076,599 | A | * | 12/1991 | Lockett et al. | 280/204 |
|---|---|---|---|---|---|
| 5,454,578 | A | * | 10/1995 | Neack | 280/204 |
| 5,577,746 | A | * | 11/1996 | Britton | 280/204 |
| 5,599,033 | A | * | 2/1997 | Kolbus et al. | 280/204 |
| 6,193,252 | B1 | * | 2/2001 | Lin | 280/204 |
| 6,196,572 | B1 | * | 3/2001 | Durrin | 280/648 |
| 2001/0002745 | A1 | * | 6/2001 | Weber | 280/62 |

* cited by examiner

Primary Examiner—Kevin Hurley
(74) Attorney, Agent, or Firm—Harry I. Leon; Vivian L. Steadman

(57) ABSTRACT

An apparatus for towing a bicycle with another bicycle when the first bicycle is also towing a baby jogging cart or, alternately, a bicycle trailer or trail-a-bike. Particularly useful for exercising with a child and allowing her to ride a bike until tired, and then towing the child's bike while she rests in the jogging cart, the apparatus comprises a bracket assembly which is removably mounted on the rear wheel support structure of the towing bicycle. The bracket assembly comprises a hitch pin which is removably attached by a flexible connector to the towing arm. The latter is connected to the front of the jogging cart and its undercarriage. Prior to towing the child's bike, one turns its front wheel approximately 90 degrees and places it between the axle of the jogging cart and the back of the cart's seat. Straps hold the wheel of the towed bicycle and its handle bar to the axle and to jogging cart handle, respectively. In this position, the handle bar bearings allow the towed bike to easily track behind the jogging cart. Further, when towed, the child's bike leans outward during turns; and its rear wheel is free to move over unevenness in the road, thus providing ease of handling for the towing bicyclist.

4 Claims, 7 Drawing Sheets

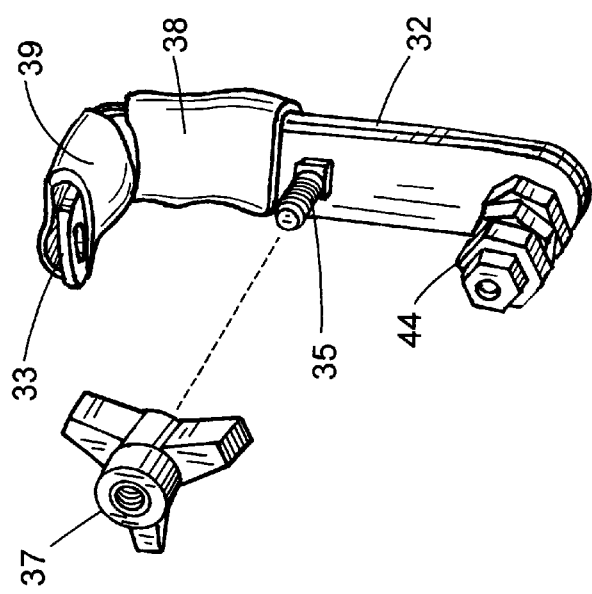
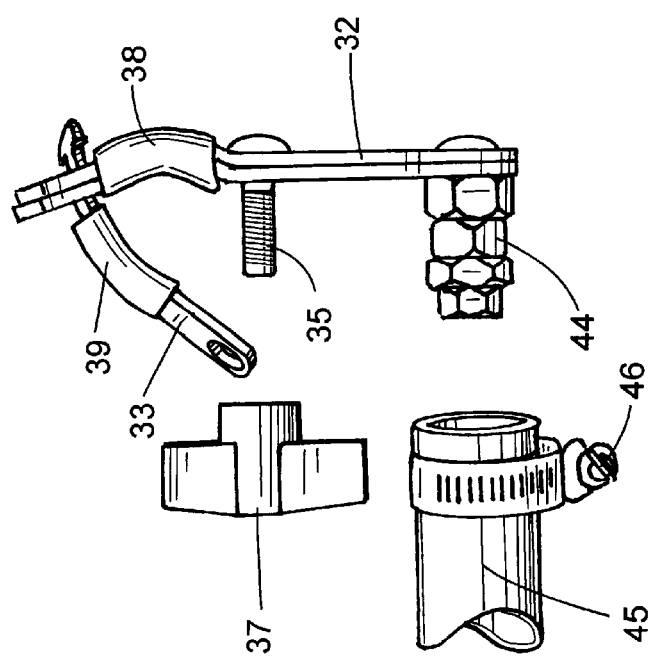
*Fig. 7*
*Fig. 6*

BICYCLE TRANSPORTER

CROSS REFERENCE TO RELATED APPLICATION

The subject matter of this application was disclosed in U.S. Provisional Patent Application Ser. No. 60/277,905, filed Mar. 23, 2001.

SUMMARY OF THE INVENTION

The object of this invention is to provide an apparatus for transporting at least one bicycle behind another bicycle. Such an apparatus is particularly useful for occasions in which one bicyclist wishes to travel a shorter distance or take only a one-way trip and her partner is willing to assume the responsibility for towing her bicycle for the rest of the trip.

A further object of the present invention is to provide a pedal-powered bicycle transporter which can be used even if the child's bicycle has training wheels, thereby allowing it to serve for a long time as tool to motivate both the adult and child to enjoy a fun exercise together.

In accordance with the present invention, the apparatus comprises a baby jogging cart equipped with a special adapter which allows it to be used as a trailer behind a bicycle and at least one pair of straps attached to the rear of the cart. With this combination, an adult can exercise with a child, while the child gains confidence and stamina with her own bicycle. Once the child becomes tired, she can rest in the jogging cart, while the adult, using the present invention, tows both her and her bicycle.

Because of the special adaptor, a standard jogging cart can be towed behind a bicycle, without modifying the latter. Rather, the special adaptor includes a mounting bracket which, in use, is bolted onto the rear wheel support frame of the towing bicycle, near its axle. The mounting bracket comprises two meshing flange plates which are held in assembled relation by a single bolt having an enlarged nut. This nut is easily tightened without the use of tools.

Also included in the special adaptor are a hitch pin mounted on one of the flange plates, a towing arm, and a flexible member for connecting the hitch pin thereto. The flexible member, which is preferably a short section of rubber hose, is held in place on the hitch pin by a hose clamp. In addition, a safety strap fastened to the towing arm is secured to the frame of the towing bicycle.

Distal from the towing bicycle, the towing arm is attached to the jogging cart from which its front wheel has been temporarily removed. Means for holding the towing arm and the jogging cart in assembled relation comprises a spacer, a first bolt which is insertable therein, a pair of second bolts which protrude downwardly from the undercarriage of the cart seat, and winged nuts for threadedly engaging the first and second bolts. The spacer accounts for the difference in width between the towing bar and the front wheel of the jogging cart. The winged nuts allow for ease of installation and removal.

In use, the bicycle is towed with its front wheel turned about 90 degrees and is placed between the rear axle of the jogging cart and the back of the jogging cart seat. Means for temporarily securing the bicycle to the rear of the cart include first and second straps and an elastic band. The first strap confines the rim of the towed bike wheel between the jogging cart axle and its vertical supports; and the second strap limits the movement of the bicycle handle bars relative to the handle of the jogging cart. Once the towed bike is strapped into place, the elastic band is placed around the stem of its handle bars. Attached to the cart's handle, distal ends of the elastic band are preferably inserted into holes formed therein which are usually provided to facilitate mounting a sun shield accessory on the jogging cart.

With the front wheel of the towed bicycle so positioned, its steering post bearing facilitates turning movements. Also, the back wheel of the bicycle is free to move up or down so that it can roll easily over any roughness in the road. Further, the towed bike is free to lean as it goes around curves, shortening the turning radius.

The bicycle transporter according to the present invention can be used in combination with a wide variety of baby jogging cart models. Among these models are the Easy Strider R manufactured by Huffy (U.S. Pat. Nos. 5,029,891, D315885) and a stroller/jogger from Instep (U.S. Pat. No. 5,029,891). Alternately, the bicycle transporter can be used in combination with currently marketed bicycle trailers and trail-a-bike designs.

BRIEF DESCRIPTION OF THE DRAWINGS

FIG. 6 is an exploded view of the mounting bracket assembly and a fragmentary portion of the flexible member in the bicycle transporter according to FIG. 1;

FIG. 7 is an exploded perspective view of the mounting bracket assembly, according to FIG. 6;

DETAILED DESCRIPTION OF THE PREFERRED EMBODIMENT

Figure 1:
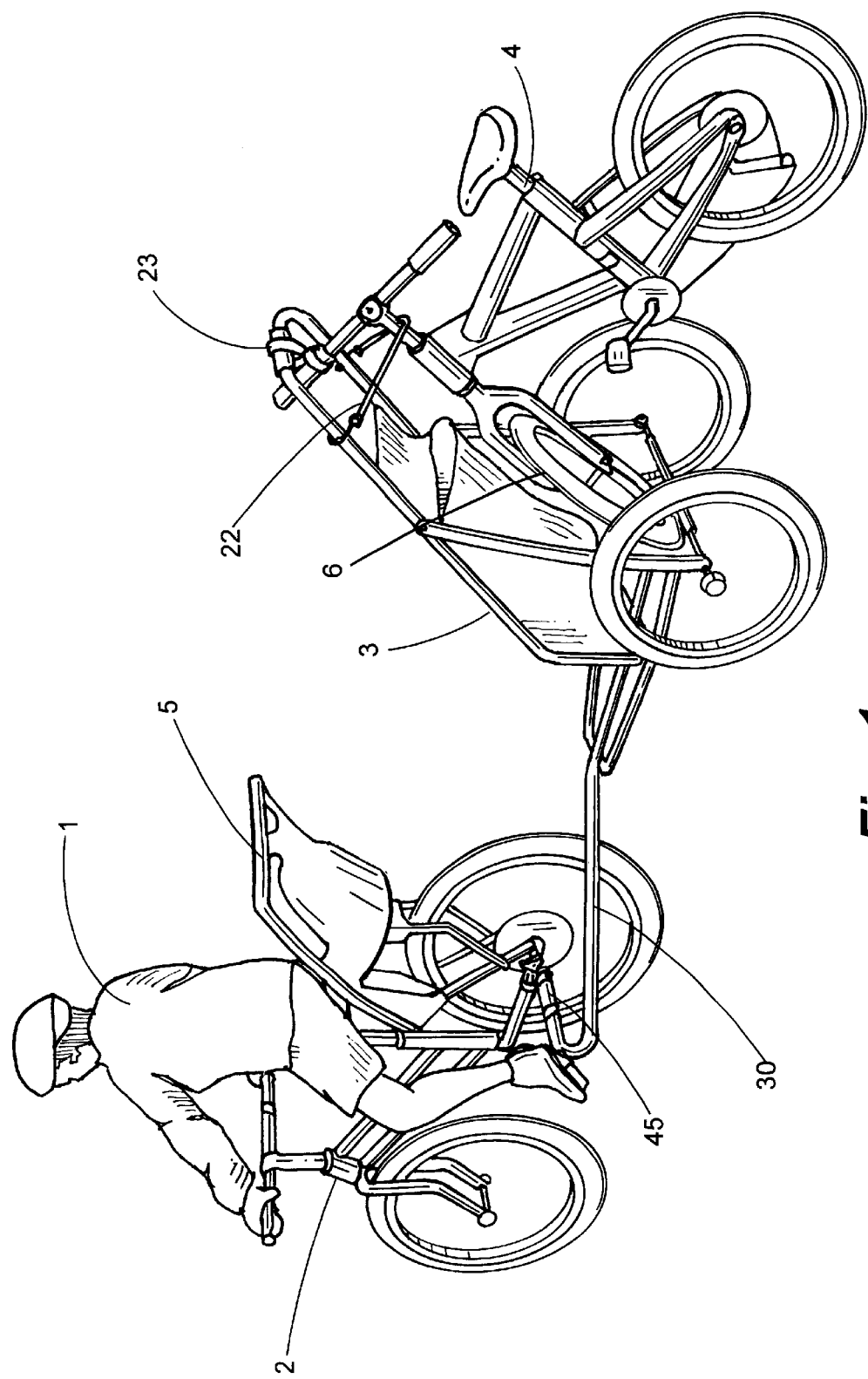
FIG. 1 is a perspective overview of the bicycle transporter according to the present invention, in use.

In the drawings, a bicycle transporter according to the present invention includes a towing arm 30 and a mounting bracket assembly. Distal ends of the towing arm 30 are connected to the rear wheel of a first bicycle 2 and to a baby jogging cart 3, on the rear of which is secured a towed bicycle 4 (FIG. 1). The towing arm 30 is attached to the bicycle 2 in such a way that a baby seat 5 can be mounted thereon behind a rider 1 (FIG. 1).

Figure 8:
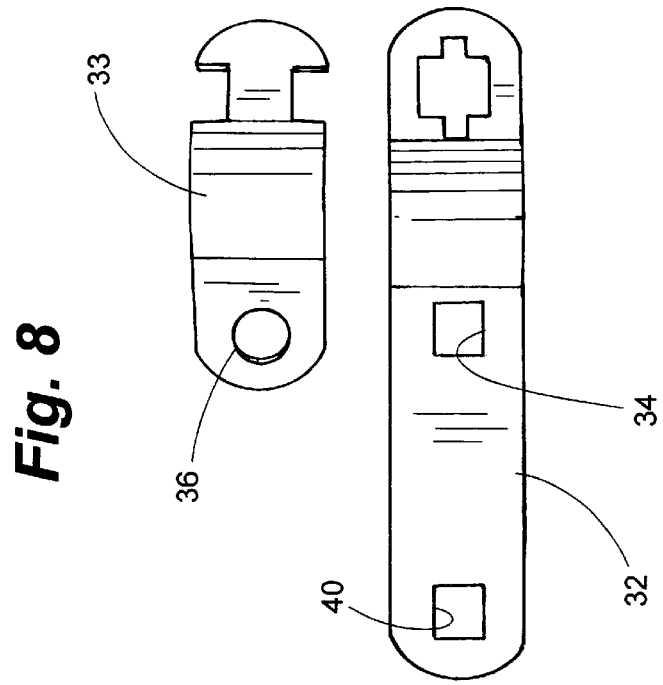
FIG. 8 is a top plan view of two meshing flange plates which, when interlocked, comprise the mounting bracket in the bicycle transporter according to FIG. 1.

The mounting bracket assembly comprises two meshing flange plates 32, 33 which define central aperture 34 and end hole 36, respectively, and a hitch pin 44 (FIGS. 6, 7 and 8). The hitch pin 44 includes a bolt 35 which is held in place within an end aperture 40 defined by the longer flange plate 32 by a series of nuts and washers.

Figure 11:
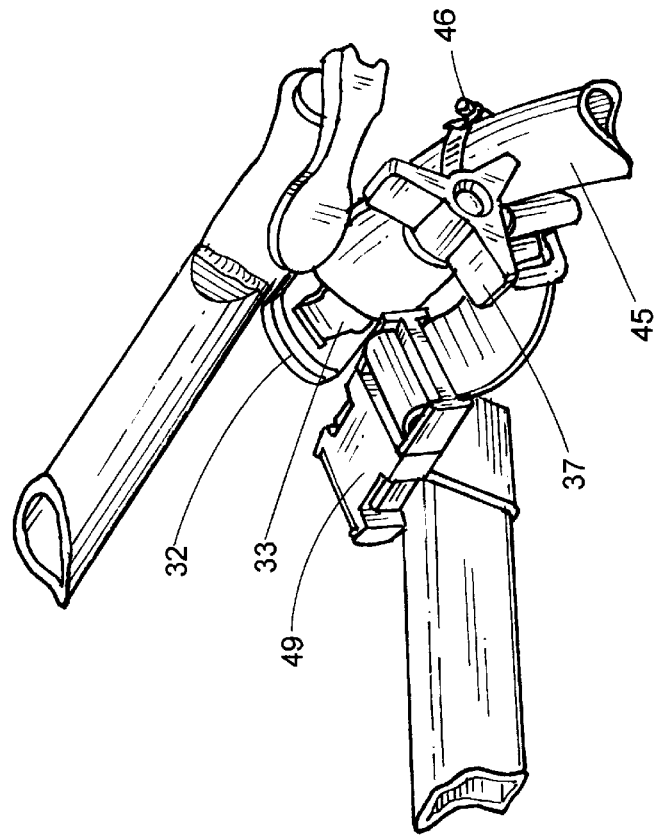
FIGS. 11 and 13 are perspective views of the mounting bracket assembly and a fragmentary portion of the flexible member in the bicycle transporter according to FIG. 1, the mounting bracket assembly being shown secured to the frame of the bicycle shown, as a fragment, in FIGS. 10 and 12, respectively.
Figure 10:
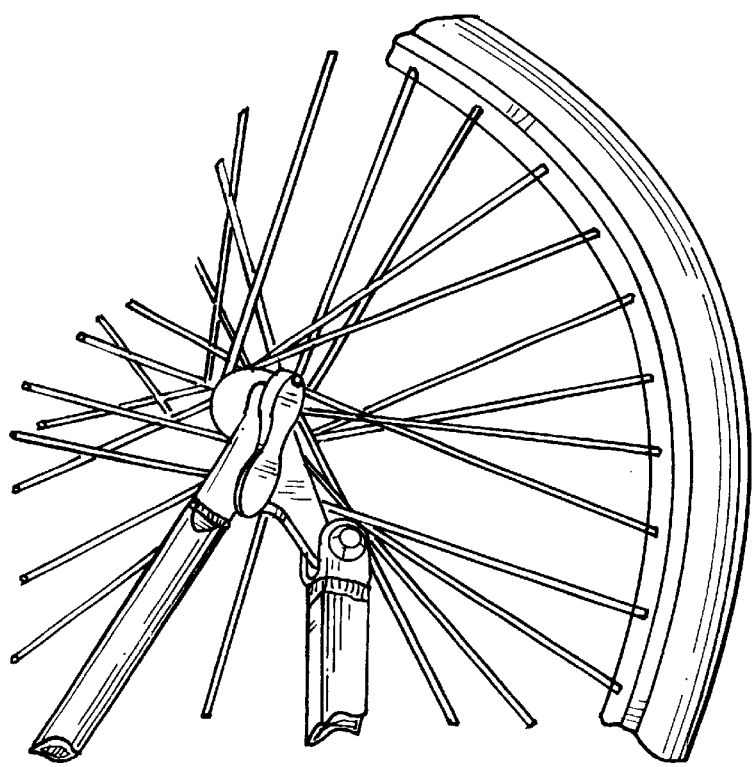
FIGS. 10 and 12 are side elevation views of a fragmentary portion of a bicycle having a quick disconnect rear wheel and a standard bolted-on rear wheel, respectively, on which the bicycle transporter (not shown) according to FIG. 1 can be mounted.
Figure 13:
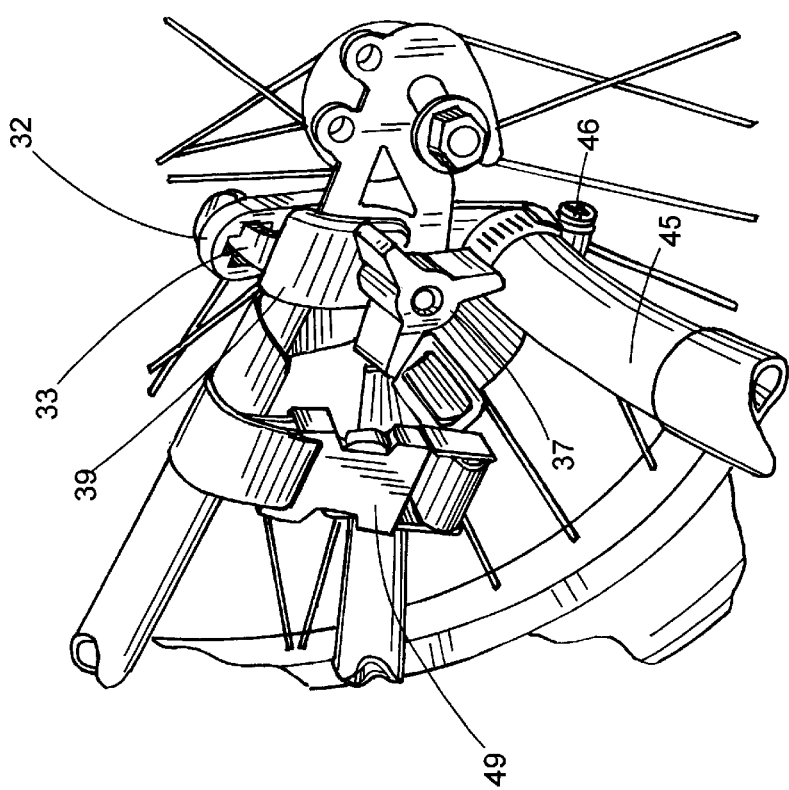
Figure 12:
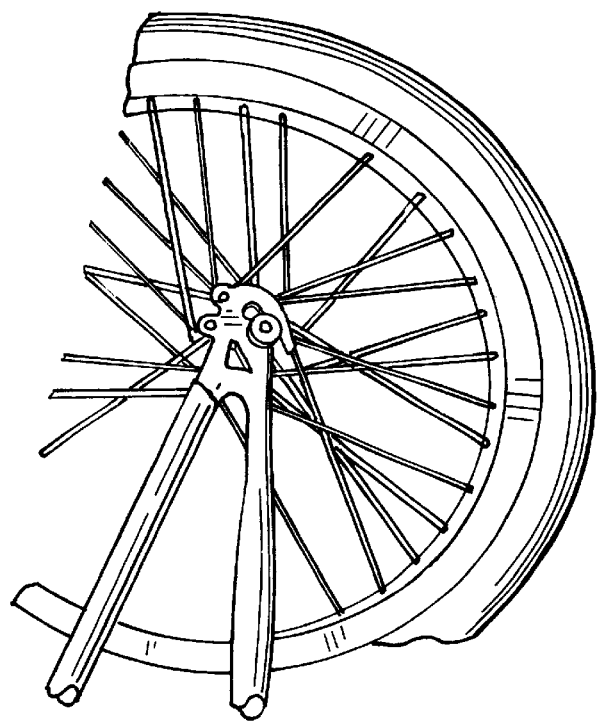

Once the flange plates 32, 33 have been coupled, they are installed on the first bicycle 2, which can have a quick disconnect rear wheel as shown prior to and post installation in FIGS. 11 and 13, respectively. Alternately, the meshing flange plates 32, 33 can be mounted on a bicycle having a standard bolted-on rear wheel (FIGS. 10 and 12).

To install the mounting bracket assembly, one positions longer flange plate 32, with the shorter plate 33 coupled thereto, inside the rear wheel support structure of the bicycle 2. Shorter flange plate 32 is then moved into such a position that bolt 35 can be simultaneously retained within center aperture 34 and inserted into end hole 36 (FIGS. 6, 7 and 8). Means for retaining the flange plates 32, 33 and bolt 35 in assembled relation, clamped to the rear wheel support structure, comprises a nut 37 having a large handle head. Preferably, the flange plates 32, 33 are also provided with pads 38, 39 to protect the finish on the bicycle frame (FIGS. 6, 7).

Figure 9:
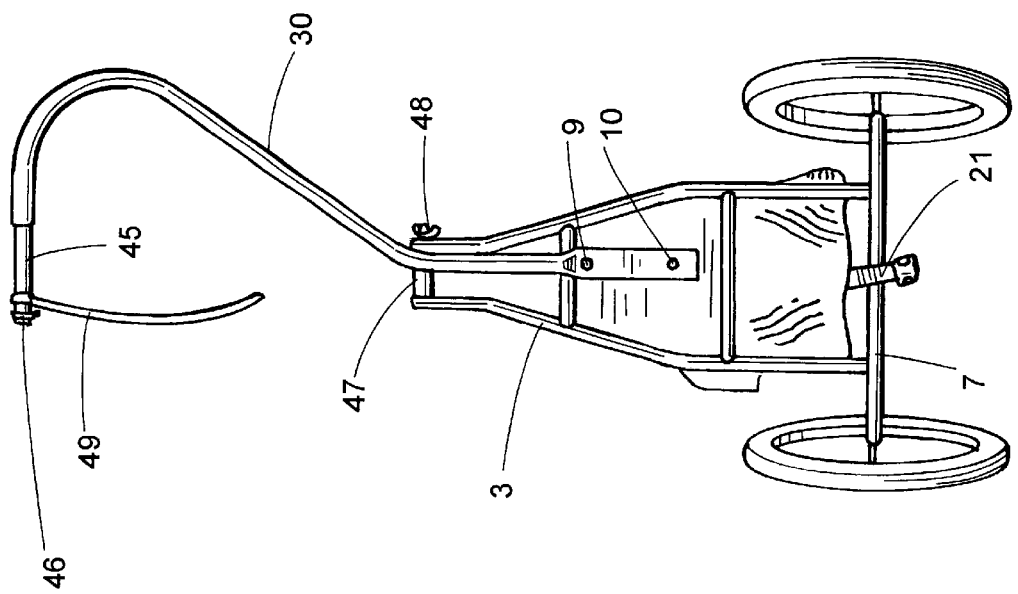
FIG. 9 is a bottom plan view of a fragmentary portion of the bicycle transporter according to FIG. 1, showing the towing arm and the flexible member, as well as the undercarriage of the jogging cart to which the towing arm is attached.

Means for secruing the towing arm 30 to the mounting bracket assembly comprises a flexible connector 45 attached at its distal ends to the hitch pin 44 and to the towing arm, respectively (FIGS. 6 and 9). A clamp 46 is used to hold the flexible connector 45 in place on the hitch pin 44 (FIGS. 6, 11, 13). In the preferred embodiment, the flexible connector 45 is a hose which measures, by way of example, 1 inch in diameter and 10 inches long. In addition, distal ends of a first safety strap 49 are attached to the towing arm 30 and to the rear wheel support structure (FIGS. 11 and 13).

Shaped roughly in the form of a large imaginary question mark, the towing arm 30 defines an arcuate front section which allows the towed jogging cart 3 to be centered behind the rear wheel of the towing bicycle 2 (FIG. 9). Rearwardly of the arcuate front section, the towing arm 30 is attached to the handle of the jogging cart 3 with a bolt, threadedly engageble with a wing nut 48, and a spacer 47 (FIG. 9). Means for attaching the towing arm 30 to the undercarriage of the baby jogging cart include two bolts which protrude downwardly therefrom and winged nuts 9, 10 for threadedly engaging them (FIG. 9).

Figure 2:
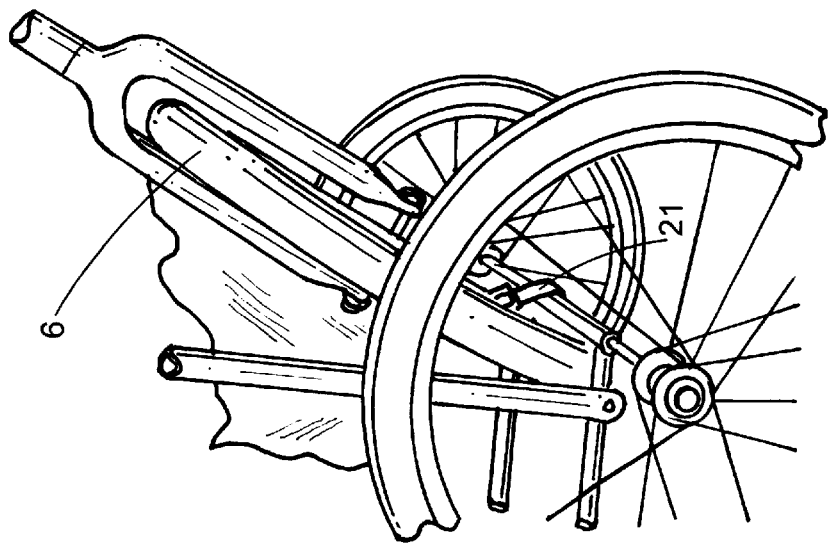
FIGS. 2 and 3 are rearward and side perspective view, respectively, of the bicycle transporter according to FIG. 1, showing the first strap and fragmentary portions of a jogging cart and a towed bicycle mounted thereon.
Figure 3:
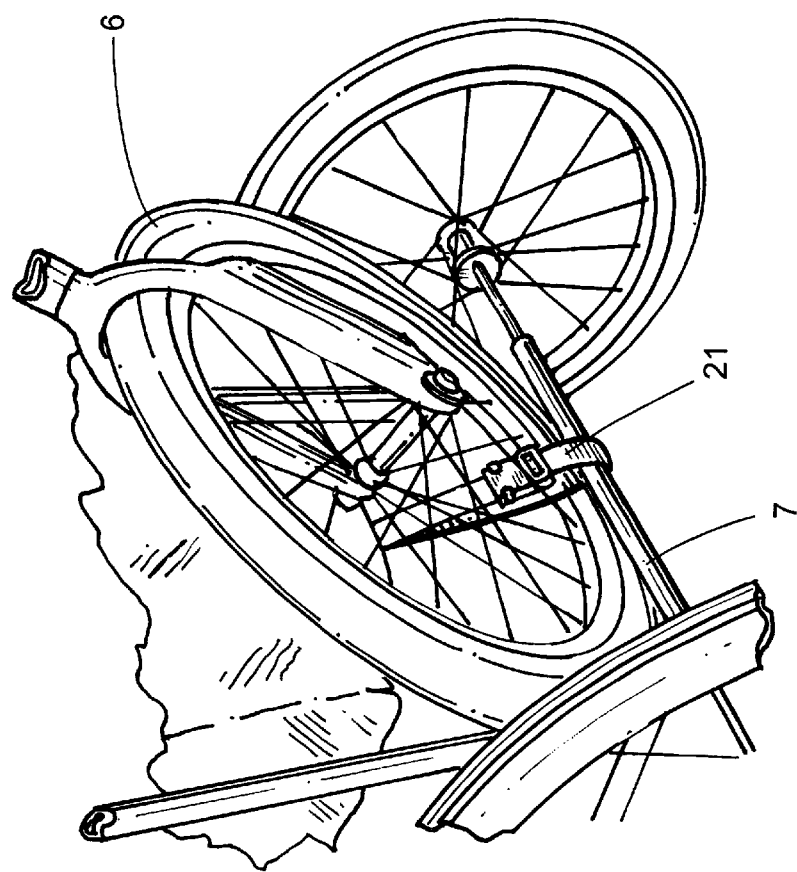
Figure 5:
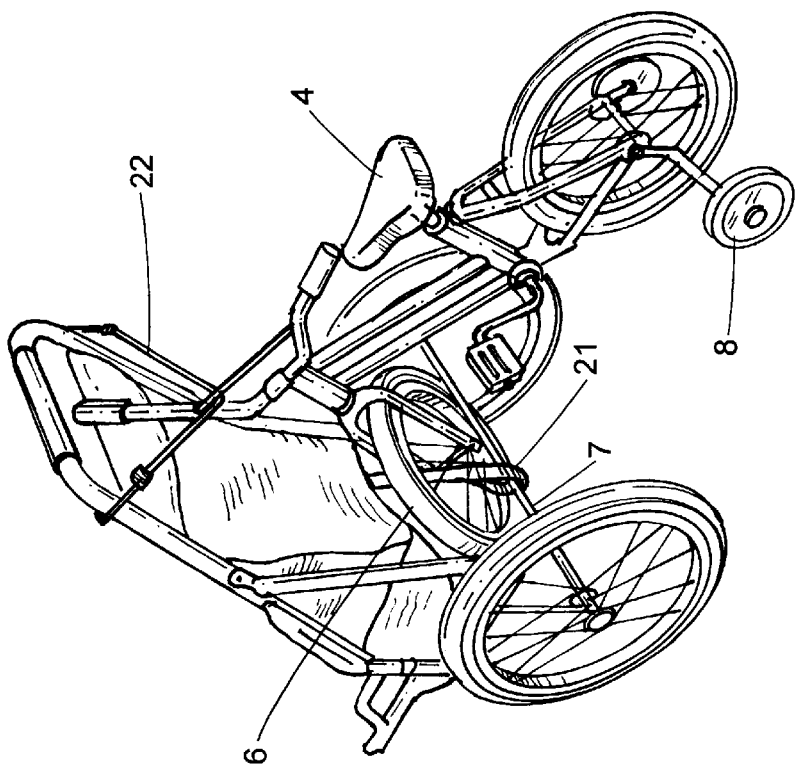
FIG. 5 is a perspective view of the bicycle transporter according to FIG. 1, showing the first and second straps and the elastic band, fragmentary portions of the jogging cart, and a towed bicycle mounted thereon, the towed bicycle being equipped with training wheels.
Figure 4:
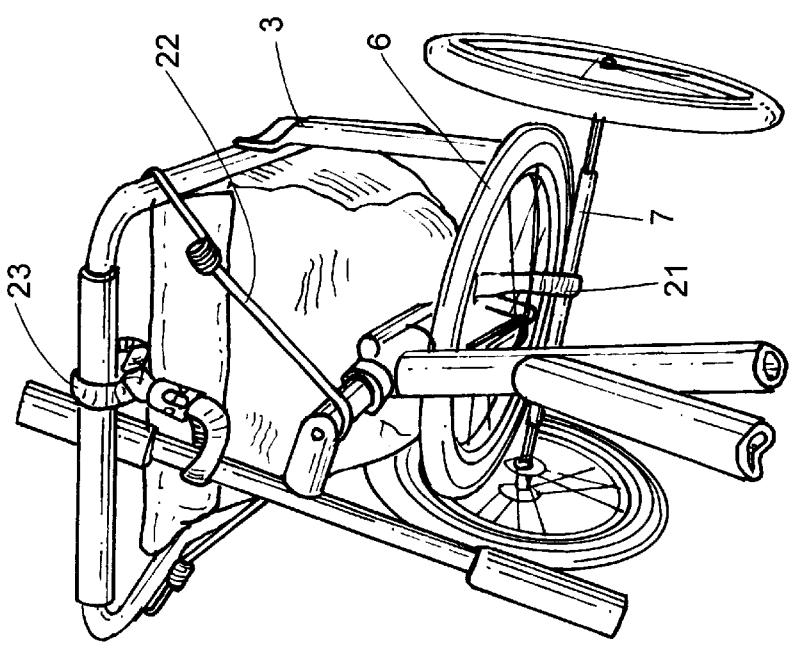
FIG. 4 is a top perspective view of the bicycle transporter according to FIG. 1, showing the first and second straps and the elastic band and fragmentary portions of the jogging cart and a towed bicycle mounted thereon.

The procedure for securing the towed bike 4 to the rear of the jogging cart 3 as follows: The front wheel 6 is turned approximately 90 degrees and placed in front of the cart's rear axle 7 (FIGS. 1, 2, 3). A quick opening strap 21 is then inserted through the spokes and secured around both the rim of wheel 6 and 0the axle 7. Next an elastic band, such as a bungie cord 22 having hooked ends, is wrapped around the towed bike handle stem; and the hooks are placed in holes, otherwise used to hold a sun screen on the jogging cart, defined by the cart handles (FIGS. 4, 5). The use of the elastic band keeps the towed bike in a vertically upright position while it is being towed in a straight path and allows it to lean smoothly outward on turns before returning it to an upright position, because of tension in the elastic band which tends to restore it to its shortest configuration.

A second safety strap 23 is used to secure the bicycle handles to the jogging cart 3 so that the bicycle's front wheel 6 is maintained in a position of being turned approximately 90 degrees. The towed bicycle 4 can be mounted on or removed from the transporter in an interval of less than one minute. Moreover, a towed bicycle 4 equipped with training wheels 8 is handled in the same manner as a bicycle without training wheels (FIG. 5).

In operation, the bicycle transporter according to the present invention allows the rider 1 to tow the jogging cart 3 and bicycle 4 in tandem even over rough roads and curbs. With its mechanism for mounting the towed bicycle 4, the bike transporter can be utilized even while a child reclines in the seat of the baby jogging cart 3 and her bicycle 4 is being towed.

For storage, the towing arm 30 is disconnected from the towing bike 2 by opening the buckle of the safety strap 49 and turning the enlarged nut 37. The towing arm 30 can be left in place or, alternately, removed from the baby jogging cart 5 by unthreading wing nuts 9, 10, 48.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. An apparatus for towing a second bicycle with a first bicycle, the first bicycle having a rear wheel support structure, comprising:
   (a) a baby jogging cart having a handle, a seat, a rear axle, and front wheel support forks; the jogging cart having its front wheel removed;
   (b) a bracket assembly removably mounted on the rear wheel support structure;
   (c) means, including a towing arm and a hitch pin, for towing the jogging cart, the towing arm being flexibly connected to the hitch pin, the hitch pin being mounted on the bracket assembly, the hitch pin and an elongated section of the towing arm proximate therewith being aligned parallel with the rotational axis of the rear wheel of the first bicycle, the towing arm extending rearwardly from the first bicycle and being fastened to the front wheel support forks of the jogging cart; and
   (d) means for removably attaching the second bicycle to the rear of the jogging cart.

2. The apparatus according to claim 1 in which the bracket assembly further comprises two flange plates which are movably coupled together and means, including a bolt and nut for threadedly engaging the bolt, for holding the flange plates in assembled relation when they are clamped around a portion of the rear wheel support structure.

3. The apparatus according to claim 1 wherein the means for removably attaching the second bicycle further comprises at least one flexible strap for holding the front wheel of the second bicycle in front of the rear axle of the jogging cart and at least one elastic band for attaching the handle stem of the second bicycle to the handle of the jogging cart, so that the second bicycle can be towed with its front wheel held in a position in which it is turned approximately 90 degrees and placed between the rear axle and the rear of the jogging cart seat.

4. An apparatus for towing a second bicycle with a first bicycle, the first bicycle having a rear wheel support structure, comprising:

(a) a baby jogging cart having a handle, a seat, a rear axle, and front wheel support forks; the jogging cart having its front wheel removed;

(b) means, including a bracket assembly and a towing arm, for towing the jogging cart, the bracket assembly being removably mounted on the rear wheel support structure, the towing arm being flexibly connected to the bracket assembly, the towing arm extending rearwardly from the first bicycle and being fastened to the front wheel support forks of the jogging cart; and (c) means, including at least one flexible strap for holding the front wheel of the second bicycle in front of the rear axle of the jogging cart and at least one elastic band for attaching the handle stem of the second bicycle to the handle of the jogging cart, for towing the second bicycle with its front wheel held in a position in which it is turned approximately 90 degrees and placed between the rear axle and the rear of the jogging cart seat.

\* \* \* \* \*